United States Patent
Kelley et al.

(10) Patent No.: US 7,243,149 B2
(45) Date of Patent: Jul. 10, 2007

(54) SYSTEM AND METHOD FOR DETERMINING A PRESENCE STATE OF A USER

(75) Inventors: Sean S. Kelley, Barrington, IL (US); John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 96 days.

(21) Appl. No.: 11/242,457

(22) Filed: Oct. 3, 2005

(65) Prior Publication Data

US 2007/0078968 A1    Apr. 5, 2007

(51) Int. Cl.
*G06F 15/173* (2006.01)
*G06F 7/00* (2006.01)
*H04Q 1/30* (2006.01)

(52) U.S. Cl. .................. 709/224; 340/531; 707/100
(58) Field of Classification Search ............... None
See application file for complete search history.

(56) References Cited

U.S. PATENT DOCUMENTS

| | | |
|---|---|---|
| 2005/0068167 A1* | 3/2005 | Boyer et al. ............. 340/531 |
| 2005/0080800 A1* | 4/2005 | Parupudi et al. .......... 707/100 |
| 2005/0108341 A1* | 5/2005 | Mathew et al. ........... 709/206 |
| 2007/0036320 A1* | 2/2007 | Mandalia et al. ...... 379/210.01 |

* cited by examiner

*Primary Examiner*—Wen-Tai Lin

(57) ABSTRACT

Presence information associated with a presence entity (102) is received. A composition rule associated with the presence information is also received. The composition rule is applied to the presence information in order to determine a presence state for the presence entity (102).

16 Claims, 3 Drawing Sheets

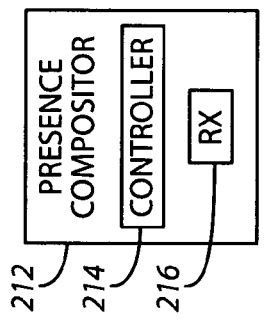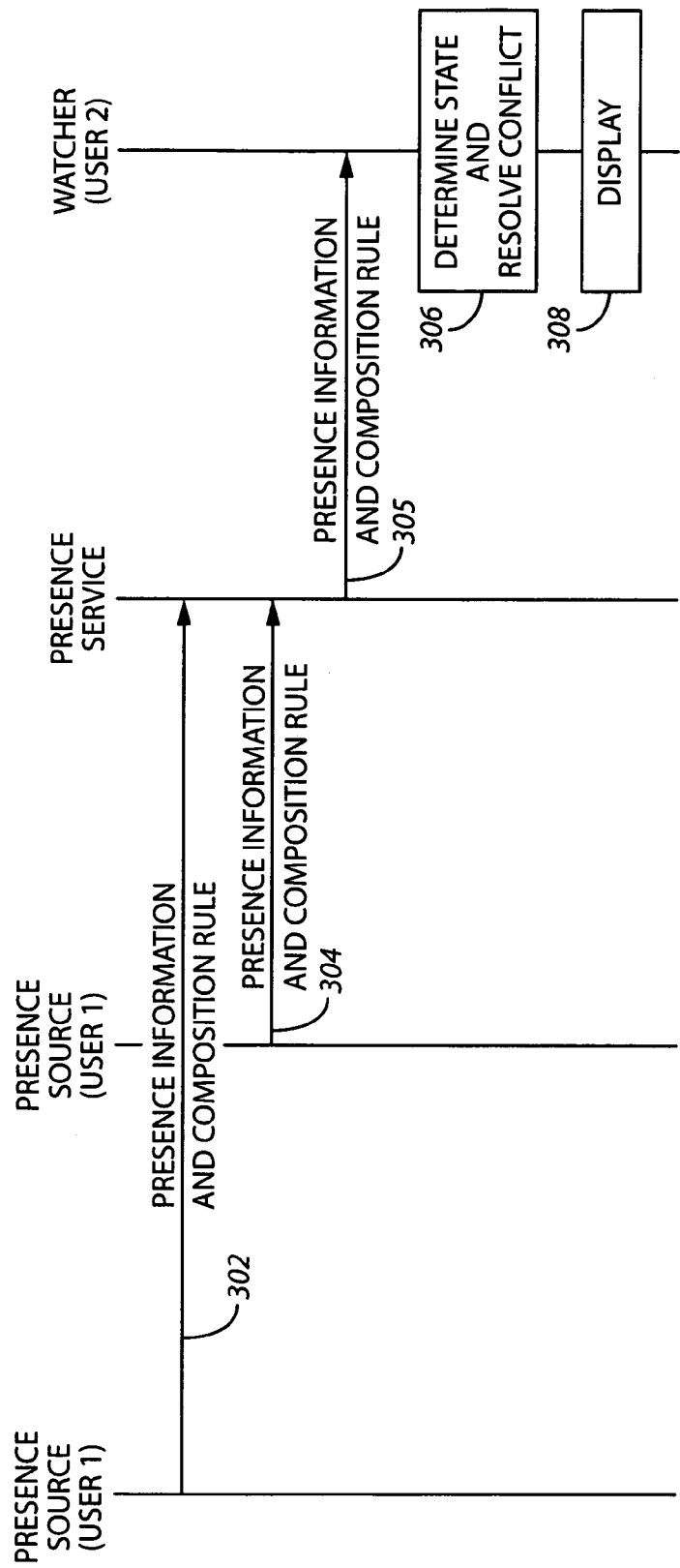

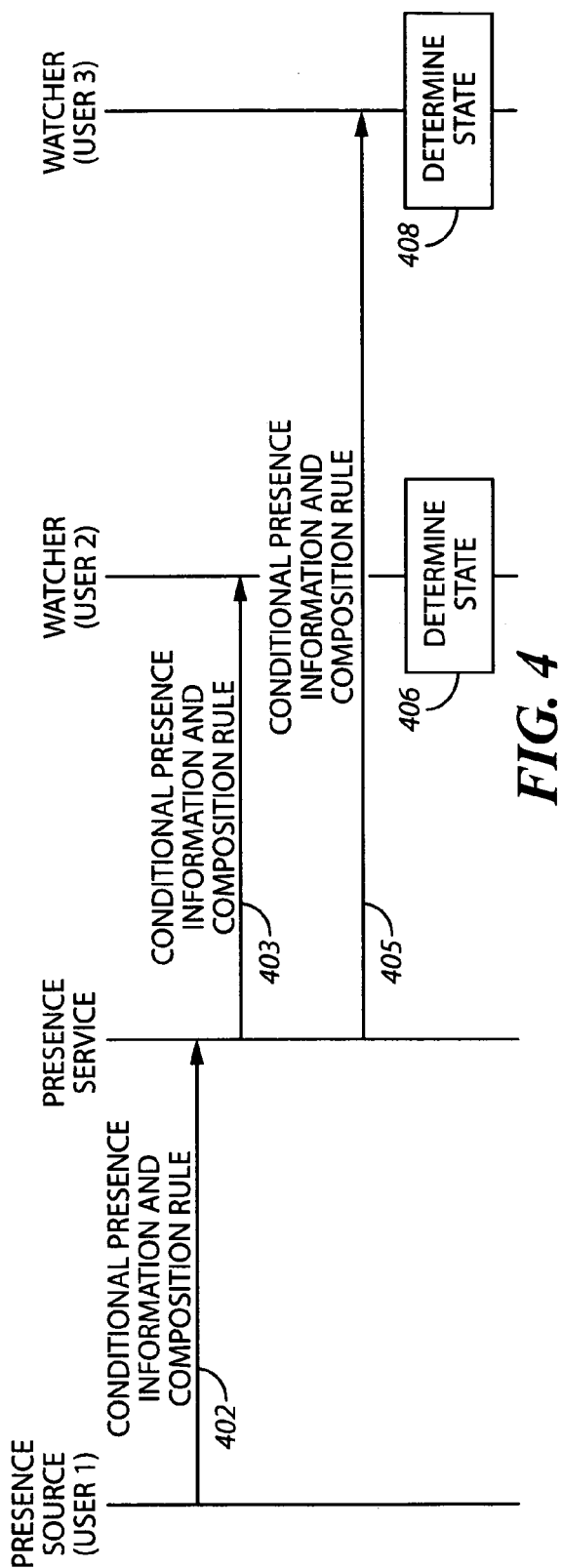
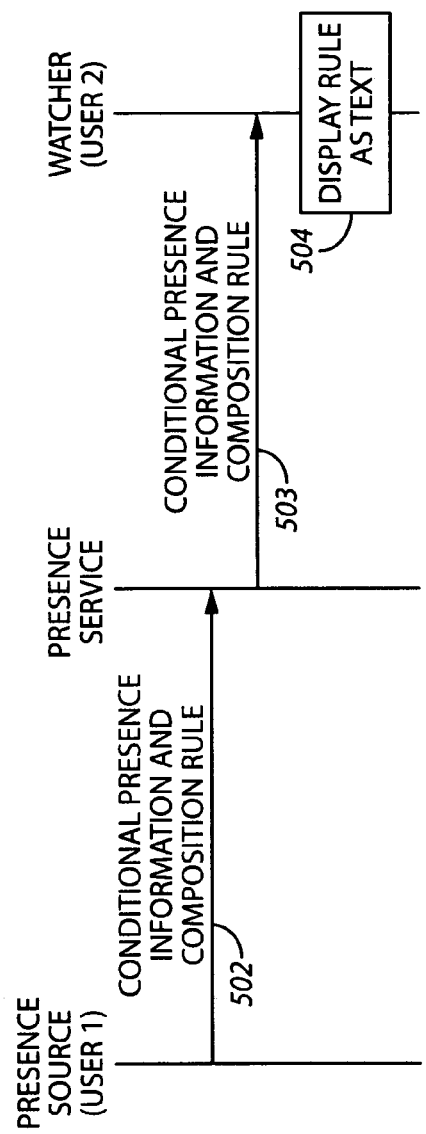

SYSTEM AND METHOD FOR DETERMINING A PRESENCE STATE OF A USER

FIELD OF THE INVENTION

The field of the invention relates to enhancing the productivity of users in communication networks.

BACKGROUND OF THE INVENTION

Watchers in presence-enabled networks typically examine the presence state of presence entities (e.g., human users or help desks) operating within these networks in order to determine whether these presence entities are available or unavailable to receive communications. The presence state is typically transmitted to the watcher device by a presence service and, based upon this state, contact with the presence entity may be either encouraged or discouraged.

In some situations, information relating to the presence state of a particular user can be published by multiple unsynchronized sources, which sometimes leads to conflicts. For instance, a user might be associated with multiple presence-enabled devices (e.g., a personal computer and a cellular telephone) as well as network entities (e.g. PoC server, publishing PoC availability based on registration state) all publishing information on behalf of the user. One application (e.g., the cellular phone) might believe that the user is in their vehicle while the other application (e.g., the personal computer) might believe that the user is at the office.

Previous systems used fixed and standardized composition rules in an attempt to resolve presence conflicts. Composition rules are defined per presence information "type". For example, a user's activity/location is a "person" type of element. These rules were programmed into the presence service and/or watcher, and could not be modified. In one example of a fixed composition rule, the latest presence information published was the information that was deemed the most reliable and was the information used to determine the presence state.

Unfortunately, these previous approaches often produced erroneous results. For instance, a user might drive to work in the vehicle early in the morning and bring their cellular phone. The cellular phone with the user would publish presence information to a presence service indicating that the user was in their vehicle and on their way to work. At a later time, an application (e.g., a desktop calendar) running on a personal computer at the office would assume the user was at the office and automatically publish this information to the presence service. However, the user might be late for work and still in their vehicle when the application at the personal computer published its information. Since one set of presence information indicated that the user was at the office while the other information indicated that the user was in their vehicle, a conflict existed. Using the "latest publication" composition rule to resolve the conflict produced the result that the user was at the office, since this information was the latest received. Unfortunately, this result was incorrect because the user was actually late for work and still in their vehicle. Thus, in this example, communications destined for the user were erroneously directed to the office of the user and contact with the user could not be established.

As a consequence of the above-mentioned problems, user frustration with the system increased as communications were incorrectly routed and/or prohibited. Since in many situations the problems occurred in a work environment, worker productivity was also adversely affected.

BRIEF DESCRIPTION OF THE DRAWINGS

FIG. 2 is a block diagram of a presence compositor according to the present invention;

FIG. 3 is a call flow diagram of an approach for determining a presence state according to the present invention;

FIG. 4 is a call flow diagram of an approach for determining a presence state according to the present invention; and FIG. 5 is a call flow diagram of an approach for determining a presence state according to the present invention.

Figure 1:
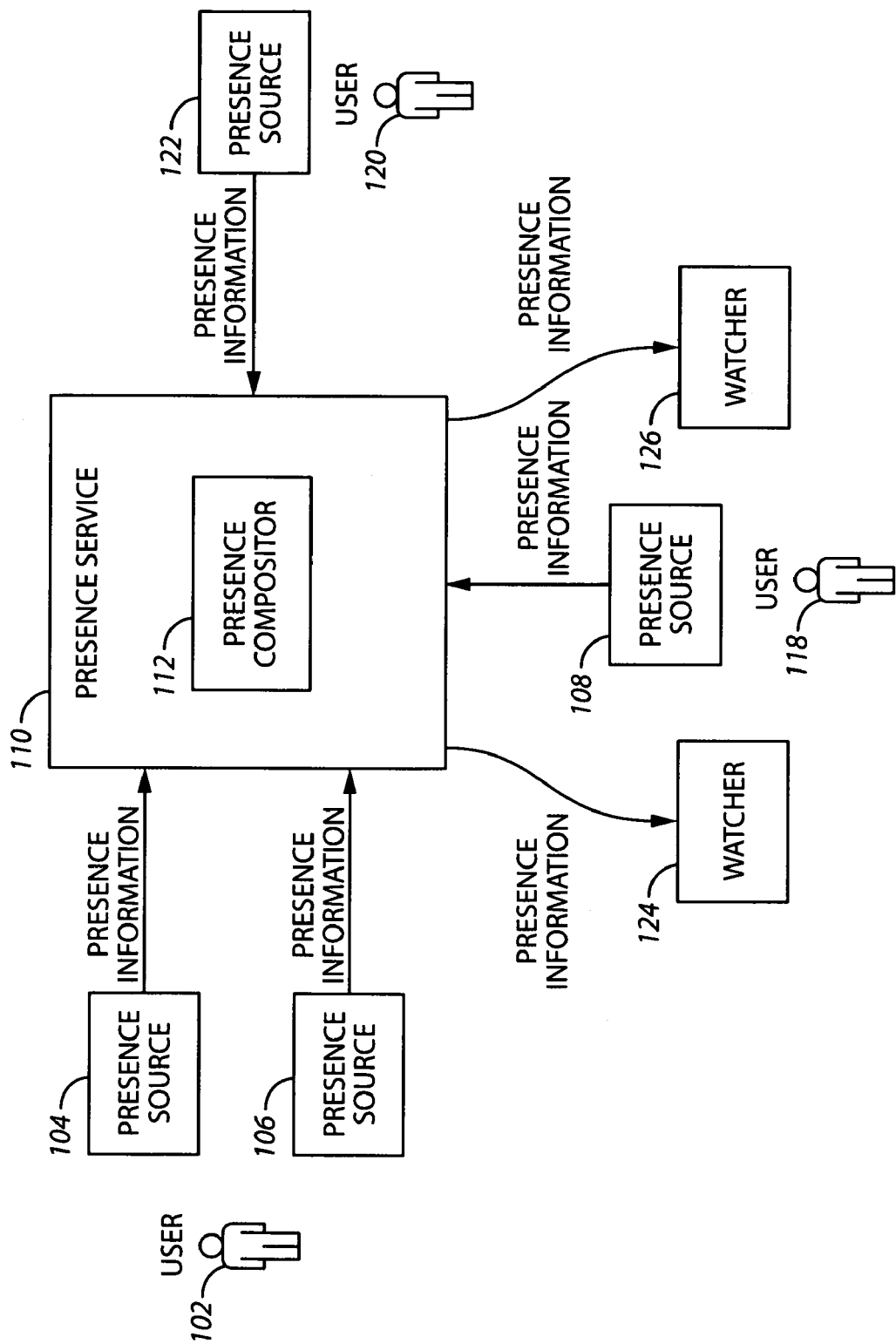
FIG. 1 is a block diagram of a system for determining a presence state according to the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

A system and method determines the presence state of a presence entity (e.g., a human user or help desk) by receiving presence information and an associated composition rule from a single or from multiple presence sources. A presence compositor applies the composition rule to the information to resolve conflicts and obtain a single coherent presence state. Since the composition rule need not be fixed, but may change according to the reliability of the source of the information, more accurate presence state determinations can be made.

In many of these embodiments, presence information associated with a presence entity (e.g., human user) is received, for example, at a presence service (e.g., presence server) which stores and distributes the information to authorized watchers who request presence information about the user. The presence information may indicate a characteristic of a user such as the user's availability to receive communication, the user's activity, the geographical location of a user, the location type of a user, or whether the user is logged into a computer system. Other examples of presence information are possible.

A presence client publishes a presence state and a set of associated composition rules, which are used to resolve conflicts. The composition rule associated with the presence information is received by a presence compositor. The presence compositor (e.g., a function within the presence service or watcher) applies the composition rule to the presence information in order to determine a single coherent presence state for the presence entity. The composition rule may be based upon at least one characteristic of the system such as an override priority level, the value of a presence information element of the presence entity or the value of a presence information element of a watcher. The presence state may be available, unavailable, or conditionally available (e.g., available/unavailable, but qualified by certain conditions such as "if work related"). Other examples of composition rules and presence states are possible.

The presence information can be received from multiple sources or from a single source. For example, first presence information associated with the presence entity may be received that is generated by a first presence source and second presence information associated with the presence entity may be received that is generated by a second presence source. The first presence information may contain a conflict with the second presence information and the composition rule may be applied to resolve the conflict and determine the presence state for the presence entity. If a watcher receives presence state and composition rules, then the rules are applied to determine the presence state to be displayed to the watcher. If after applying rules there is still a conflict, then a default composition policy is applied to remaining presence data that are in conflict. If watcher does not understand a rule, then the rule is ignored (i.e. rule is assumed to be met). In a preferred embodiment, a user publishes rules that can be automatically processed by the watcher. Rules are expressed in XML, and are associated with a set of published presence information. The advantage is that if the rules are automatically processed, the "conflict" becomes transparent to the user who is watching.

Rather than having content rules configured statically into the presence server, the presence source dynamically creates and pushes the rules to the watcher, where the rules are the processed. This is advantageous because: a) the source (not the presence server) is often the best suited for creating rules, since it alone knows the precise semantics of the information and the nature of the device publishing it, and b) the watcher (not the presence server) is often the best suited for processing the rules, because knowledge of the conflicts and rules provide the watcher with a richer picture of the presence state of the user.

In many of these embodiments, various types of textual information may be displayed to a user who is watching the presence entity. For instance, textual information relating to the composition rule may be displayed. In another example, the composition rule may itself be textual information, which may be then displayed to a user. In still another example, the textual information may only be displayed to a user when a presence conflict exists. In yet another example, textual information relating to the composition rule may be displayed to a user when the presence state is a particular value, such as conditionally available.

Thus, approaches are described that more accurately determine the presence states of presence entities. These approaches are easy and cost effective to implement, and since they substantially reduce the number of inaccurate presence state determinations, the user experience with the system is enhanced.

Referring now to FIG. 1, one example of a system for determining the presence states of presence entities is described. A user 102 is a presence entity that has associated with it a presence source 104 and a presence source 106. In addition, a user 118 is a presence entity that has an associated presence source 108 and a user 120 is a presence entity that has an associated presence source 122.

The presence sources 104, 106, 108, and 122 may be any type of device or application operating on a device. For instance, the presence sources 104, 106, 108, and 122 may be cellular phones, personal computers, pagers, or personal digital assistants. In another example, the presence sources 104, 106, 108, and 122 may be applications such as calendar applications running on personal computers. Other examples of presence sources are possible.

The presence sources 104, 106, 108, and 122 are logical entities and provide presence information associated with the presence entity, such as a person or help desk, to a presence service 110. Presence sources associated with the same presence entity may supply conflicting information about that entity. For instance, the presence sources 104 and 106 may supply conflicting presence information relating to the user 102 to the presence service 110.

User 118 has an associated watcher 124, and user 120 has an associated watcher 126. The watchers 124 and 126 may be any type of device or application operating on a device. For instance, watchers 124 and 126 may be cellular phones, personal computers, pagers, or personal digital assistants. Also, watchers 124 and 126 may be operating on the same application/device as presence source 108 and 122, respectively, or may be operating on separate applications/devices. Other examples of watchers are possible. The watchers 124 and 126 are logical entities, and request presence information associated with a presence entity from a presence service 110.

Referring now to FIG. 2, a presence compositor 212 includes a receiver 216 and a controller 214. The presence compositor 212 may be included within a presence service (such as presence service 110 of FIG. 1), or within a watcher (such as within watcher 124 or 126 of FIG. 1). The controller 214 is programmed to receive presence information and a composition rule from presence sources (such as from presence sources 104, 106, 108 and 122 when included within presence service 110) or from the presence service (such as presence service 110 of FIG. 1 when included in watcher 124 or 126). The controller 214 is further programmed to apply the composition rule to the presence information in order to determine a presence state for one of the presence entities. Examples of the presence state include available, unavailable, or conditionally available. Other examples of presence states are possible. After the presence state is determined, this state may be presented to users.

The composition rule may be based upon a characteristic such as an override priority level, a presence information element of the presence entity, or a presence information element of a watcher. Other examples are possible.

Various types of textual information may also be displayed to users of the system having an associated watcher. For instance, textual information relating to or describing the composition rule may be displayed at the watcher. In another example, the composition rule may itself be textual information, and the rule can be displayed at the watcher. In still another example, textual information describing a presence conflict may be displayed at the watcher when the presence conflict exists. In another approach, textual information relating to the composition rule may be displayed at the watcher when the presence state is determined to be a particular value, such as conditionally available.

In one example of the operation of the system of FIG. 1, at 8:59 am, a first user (user 102) indicates through the presence client in their mobile phone (presence source 104) that their activity is "in-transit" and place-type is "vehicle." Because this information is manually entered (e.g., via the user interface of the mobile phone) the presence client automatically includes an indication that this presence update is the authority for the activity and place-type of the first user (user 102).

At 9:00 am, a calendar application (presence source 106) for the first user (user 102) publishes that the activity for the first user (user 102) is "appointment" and that the place type is "office." Since the first user (user 102) is not logged in to their computer, the calendar application (presence source 106) is not the authority.

At 9:02 am, a second user (user 118) has an existing subscription to the presence information of the first user (user 102). The second user (user 118) opens the presence-enabled device to see the presence status of the first user (user 102). The device (watcher 124) associated with the second user (user 118) has received notifications with presence information from both presence sources (the mobile of the first user and the calendar application of the first user) via the presence service 110. Based upon the composition rule published by the mobile phone of the first user (user 102), the second user (user 118) sees that the first user (user 102) is in-transit and still in their vehicle.

At 9:20 am, the first user (user 102) arrives at the office. The first user (user 102) can now synchronize their presence information. For example, when the first user (user 102) logs into their personal computer, the presence application (presence source 106) in the personal computer can publish that the first user (user 102) is in the office and include an indication that the calendar application (presence source 106) is now the authority for the activity and place-type (since the first user has logged into their personal computer).

In another example of the operation of the system of FIG. 1, the first user (user 102) is at the office and wishes to be available to colleagues only if they are also in the office. Using the interface of the presence enabled device, the first user (user 102) sets their presence status to available and then selects conditional and enters or selects "at the office." This composition rule indicates that the first user (user 102) is available if the location of the watcher is at the office. This rule is published by the presence enabled device (presence source 104) to the presence service 110 and stored.

The second user (user 118) and the third user (user 120) are colleagues of the first user (user 102). They have subscribed to the presence information of the first user (user 102) and they are notified of the conditional presence state of the first user (user 102). The second user (user 118) wishes to call the first user (user 102). The device (watcher 124) associated with the second user (user 118) knows that the second user (user 118) is at the office and sees the first user (user 102) as "available." The fact that the first user (user 102) is conditionally available may be invisible to the second user if the device (watcher 124) evaluates the composition rule automatically. The first user (user 102) is available for calls from the second user (user 118) immediately.

The third user (user 120) then wishes to call the first user. The device (watcher 126) of the third user (user 120) knows that the third user (user 120) is not at the office or, alternatively, may not know their location. The third user (user 120) sees the first user (user 102) as "conditionally available" or alternatively as "unavailable" since the fact that the first user (user 102) is conditionally available may be invisible to the third user (user 120) (e.g., if watcher 126 evaluates the composition rule automatically). If the third user (user 120) wishes to call the first user (user 102), he selects the first user (user 102) in his contact list and his user interface may display a textual message "Please call only if you are at the office." The third user (user 120) knows to call again later when the third user (user 120) is at the office.

Referring now to FIG. 3, one example of an approach for determining a presence state of a presence entity is described. In this example, conflicting information and composition rules from two separate presence sources associated with a presence entity are resolved. At step 302, presence information and a composition rule are sent from a first presence source associated with User 1 to a presence service accessible by User 2. For instance, a mobile telephone associated with User 1 may send this information to a presence service accessible by User 2.

At step 304, presence information and a composition rule may be sent from a second presence source associated with User 1. For example, presence information and a compositional rule may be sent from an application running on a personal computer associated with User 1.

At step 305, the presence information and associated composition rules from the first and second presence sources may be sent by the presence service to a watcher associated with User 2, who has an existing presence subscription to User 1.

At step 306, a presence state is determined and the conflicting information is resolved. For instance, the rule received from the first source may indicate that the first source is the authority for determining the state and the composition rule received from the second source may indicate that it is not the authority. At step 308, any needed information may be displayed to the user. For example, the presence state may be displayed, and/or information relating to the composition rule may be displayed indicating to the second user that a conflict exists.

Referring now to FIG. 4, another approach for determining a presence state of a presence entity is described. In this example, conditional presence information and a composition rule (e.g., describing the condition) from a single presence source are resolved by multiple watchers.

At step 402, conditional presence information and a composition rule describing a condition is sent from the presence source associated with User 1 to a presence service accessible by User 2 and User 3. For instance, the composition rule may be that User 1 is available if the watcher is at work.

At step 403, the presence information and associated composition rule from the presence source is sent by the presence service to a watcher associated with User 2, who has an existing presence subscription to User 1. At step 405, the same presence information and associated composition rule from the presence source may be sent by the presence service to a watcher associated with User 3, who may also have an existing presence subscription to User 1.

At step 406, the presence state of User 1 that is visible to User 2 is determined and at step 408 the presence state of User 2 that is visible to User 3 is determined. Using the previous example, if either user is at work, then they would see the state of User 1 as available. On the other hand, if User 2 or User 3 were not at work, they would see User 1 as unavailable or conditionally available and a textual message may be displayed telling them to try to contact User 1 when they are at work.

Referring now to FIG. 5, still another example of an approach for determining a presence state of a presence entity is described. In this example, presence information and a composition rule is supplied to a watcher where the rule is expressed by text displayed to the watcher.

At step 502, presence information and a composition rule are sent from a presence source associated with User 1 to a presence service accessible by User 2. At step 403, the presence information and associated composition rule from the presence source is sent by the presence service to a watcher associated with User 2, who has an existing presence subscription to User 1. At step 504, the composition rule is displayed as text to User 2. For example, the rule may be "Contact User 1 only when you are at the Office." In this way, the rule itself is presented in textual form to User 2.

Thus, approaches are described that allow more accurate presence state determinations to be made. These approaches are easy to implement and since they reduce the number of inaccurate presence state determinations, the experience of users with the system is enhanced.

Those skilled in the art will recognize that a wide variety of modifications, alterations, and combinations can be made with respect to the above described embodiments without departing from the spirit and scope of the invention, and that such modifications, alterations, and combinations are to be viewed as being within the scope of the invention.

What is claimed is:

1. A method for determining a presence state of a presence entity comprising the steps of:
   receiving presence information associated with a presence entity;
   receiving a composition rule associated with the presence information;
   displaying textual information relating to the composition rule to a user only when a presence conflict exists; and
   applying the composition rule to the presence information in order to determine a presence state for the presence entity.

2. The method of claim 1 wherein receiving presence information comprises receiving first presence information associated with the presence entity generated by a first presence source and second presence information associated with the presence entity generated by a second presence source and wherein the first presence information contains a conflict with the second presence information and wherein applying the composition rule comprises applying the composition rule to resolve the conflict and determine the presence state for the presence entity.

3. The method of claim 2 wherein applying the composition rule comprises applying a composition rule based upon at least one characteristic selected from a group comprising: an override priority level; a presence information element of the presence entity; and a presence information element of a watcher.

4. The method of claim 1 wherein receiving presence information comprises receiving first and second presence information associated with the presence entity generated by a single presence source, wherein the first presence information contains a conflict with the second presence information, and wherein applying the composition rule comprises applying the composition rule to resolve the conflict and determine the presence state of the presence entity.

5. The method of claim 4 wherein applying the composition rule comprises applying a composition rule based upon at least one characteristic selected from a group comprising: a presence information element of the presence entity; and a presence information element of a watcher.

6. The method of claim 1 wherein applying the composition rule comprises applying the composition rule to the presence information in order to determine a presence state, the presence state being selected from a group comprising available, unavailable, and conditionally available.

7. The method of claim 6 further comprising displaying textual information relating to the composition rule to a user when the presence state is conditionally available.

8. The method of claim 1 wherein receiving presence information comprises receiving presence information indicative of a characteristic, the characteristic selected from a group comprising: an availability of a user to receive communication, an activity of a user, a geographical location of a user; a location type of a user; and whether the user is logged into a computer system.

9. The method of claim 1, further comprising the step of generating presence information comprising the substeps of:
   forming a presence message, the presence message comprising presence information and at least one composition rule for determining a presence state; and
   transmitting the presence message to a presence service.

10. The method of claim 9 wherein forming a presence message comprises forming a message comprising a composition rule, the rule based upon at least one characteristic selected from a group comprising: an override priority level; a presence information element of the presence entity; and a presence information element of a watcher.

11. The method of claim 9 wherein forming a presence message comprises forming a composition rule that is a textual message that can be displayed to a user.

12. A device for determining a presence state comprising:
   a receiver having an input; and
   a controller coupled to the receiver, the controller being programmed to receive presence information and a composition rule from an element associated with a presence entity at the input of the receiver, the controller being further programmed to display textual information relating to the composition rule to a user on a display only when a presence conflict exists and to apply the composition rule to the presence information in order to determine a presence state for the presence entity.

13. The device of claim 12 wherein the element associated with the presence entity is a presence source.

14. The device of claim 12 wherein the element associated with the presence entity is a presence server.

15. The device of claim 12 wherein the receiver receives, via the input, first presence information associated with the presence entity generated by a first presence source and second presence information associated with the presence entity generated by a second presence source and wherein the first presence information contains a conflict with the second presence information and wherein applying the composition rule comprises applying the composition rule to resolve the conflict and determine the presence state for the presence entity.

16. The device of claim 12 wherein the received presence information comprises first and second presence information associated with the presence entity generated by a single presence source, wherein the first presence information contains a conflict with the second presence information, and wherein the controller is programmed to apply the composition rule to resolve the conflict and determine the presence state of the presence entity.

* * * * *